US009457786B2

(12) United States Patent
Baumgartner et al.

(10) Patent No.: US 9,457,786 B2
(45) Date of Patent: Oct. 4, 2016

(54) MEASURING ARRANGEMENT FOR BRAKE APPLICATION FORCE MEASUREMENT OF A DISC BRAKE AND A CORRESPONDING DISC BRAKE

(71) Applicant: KNORR-BREMSE Systeme fuer Nutzfahrzeuge GmbH, Munich (DE)

(72) Inventors: Johann Baumgartner, Moosburg (DE); Alexander Werth, Munich (DE); Matthias Seidenschwang, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/511,929

(22) Filed: Oct. 10, 2014

(65) Prior Publication Data

US 2015/0027817 A1    Jan. 29, 2015

Related U.S. Application Data

(63) Continuation of application No. PCT/EP2013/001085, filed on Apr. 12, 2013.

(30) Foreign Application Priority Data

Apr. 13, 2012   (DE) ........................ 10 2012 007 471

(51) Int. Cl.
*B60T 17/22* (2006.01)
*F16D 66/00* (2006.01)
(Continued)

(52) U.S. Cl.
CPC ................ *B60T 17/22* (2013.01); *B60T 1/065* (2013.01); *F16D 55/22* (2013.01); *F16D 66/00* (2013.01);
(Continued)

(58) Field of Classification Search
CPC ........... F16D 2066/005; F16D 66/021; F16D 66/023; F16D 66/024; F16D 66/027; F16D 66/028
USPC .......................................................... 303/3
See application file for complete search history.

(56) References Cited

U.S. PATENT DOCUMENTS 4,854,424 A * 8/1989 Yamatoh ................ B60T 8/326
188/158
5,477,943 A * 12/1995 Enomoto .............. F15D 55/227
188/1.11 L
(Continued)

FOREIGN PATENT DOCUMENTS

DE           196 40 995 A1    4/1998
DE   10 2005 013 142 A1    9/2006
(Continued)

OTHER PUBLICATIONS

International Preliminary Report on Patentability (PCT/IB/326 & PCT/IB/373) dated Oct. 23, 2014, including English translation of Written Opinion (PCT/ISA/237) (seven (7) pages).
(Continued)

*Primary Examiner* — Robert A Siconolfi
*Assistant Examiner* — James Hsiao
(74) *Attorney, Agent, or Firm* — Crowell & Moring LLP

(57) ABSTRACT

A measuring arrangement for brake application force measurement of a disc brake, includes two components of the disc brake which can be displaced relative to each other along a travel path when a brake application force is applied, at least one brake application force sensor with a housing; a measurement object which can be permanently connected to one or the other of the two components and having at least one element or at least one target object which has at least one such element for contact-free interaction with the brake application force measurement sensor; and an evaluation unit. The brake application force sensor is designed for the detection of a displacement of the measurement object along the path with the evaluation unit for the conversion of the detected displacement in a measurement variable as a measurement for the brake application force. The brake application force sensor and the measurement object can be mounted with each of the two components in a removable manner. The measuring arrangement is characterized in that the brake application force sensor is arranged outside the path of the measurement object and with the observation direction thereof arranged perpendicular to the path.

20 Claims, 2 Drawing Sheets

(51) Int. Cl.
*B60T 1/06* (2006.01)
*F16D 55/22* (2006.01)
*G01L 5/28* (2006.01)

(52) U.S. Cl.
CPC ........... *G01L 5/28* (2013.01); *F16D 2066/003* (2013.01); *F16D 2066/005* (2013.01); *F16D 2066/006* (2013.01)

(56) References Cited

U.S. PATENT DOCUMENTS

| | | | | |
|---|---|---|---|---|
| 5,669,678 A * | 9/1997 | Stumpe | ...................... | B60T 8/00 303/113.4 |
| 6,176,352 B1 * | 1/2001 | Maron | .................. | G60T 13/741 188/1.11 E |
| 6,255,941 B1 * | 7/2001 | Osterman | ............... | B60T 17/08 188/1.11 E |
| 6,257,374 B1 * | 7/2001 | Strzelczyk | ............ | B60T 17/221 118/1.11 E |
| 6,279,691 B1 * | 8/2001 | Takahashi | ................ | F16D 65/18 188/1.11 E |
| 6,336,529 B1 * | 1/2002 | Schaffer | ................ | B60T 13/741 188/156 |
| 6,411,206 B1 * | 6/2002 | Weant | ...................... | B60Q 1/44 188/1.11 E |
| 7,232,013 B2 * | 6/2007 | Thrush | ................... | G16D 66/00 188/1.11 E |
| 7,401,686 B2 * | 7/2008 | Severinsson | ............ | B60T 17/22 188/1.11 E |
| 7,684,947 B2 * | 3/2010 | Laukemann | ............ | B60T 10/02 702/105 |
| 7,849,976 B2 * | 12/2010 | Kawahara | ................ | F16D 65/18 188/1.11 E |
| 8,146,715 B2 * | 4/2012 | Baier-Welt | .............. | F16D 66/00 188/1.11 E |
| 8,616,314 B2 * | 12/2013 | Murata | ................. | B60B 25/045 180/65.51 |
| 8,627,929 B2 | 1/2014 | Baumgartner et al. | | |
| 8,630,780 B2 * | 1/2014 | Bunk | .................... | B60T 8/1755 303/10 |
| 9,080,623 B2 * | 7/2015 | No | ......................... | F16D 55/226 |
| 2003/0111305 A1 * | 6/2003 | Drennen | ............... | F16D 55/227 188/73.44 |
| 2004/0238292 A1 * | 12/2004 | Ortegren | ............... | F16D 55/227 188/71.1 |
| 2005/0029056 A1 * | 2/2005 | Baumgartner | ........ | B60T 13/741 188/1.11 L |
| 2005/0067230 A1 * | 3/2005 | Kramer | .................. | G01D 5/145 188/71.8 |
| 2005/0241894 A1 * | 11/2005 | Baumgartner | ........ | F16D 65/567 188/79.51 |
| 2008/0257657 A1 * | 10/2008 | Siebke | .................... | F16D 55/22 188/1.11 L |
| 2009/0133971 A1 * | 5/2009 | Baier-Welt | .............. | F16D 66/00 188/1.11 E |
| 2009/0177362 A1 * | 7/2009 | Schmitt | ................. | F16D 66/025 701/70 |
| 2009/0320579 A1 | 12/2009 | Ante et al. | | |
| 2012/0198926 A1 | 8/2012 | Baumgartner et al. | | |

FOREIGN PATENT DOCUMENTS

| | | | |
|---|---|---|---|
| DE | 10 2006 029 987 B3 | | 11/2007 |
| DE | 10 2009 004 424 A1 | | 7/2009 |
| DE | 10 2009 005 470 A1 | | 7/2010 |
| DE | 10 2009 041 951 A1 | | 3/2011 |

OTHER PUBLICATIONS

International Search Report dated Aug. 7, 2013 with English translation (five (5) pages).
German-language Office Action dated Dec. 10, 2012 (five (5) pages).

* cited by examiner

MEASURING ARRANGEMENT FOR BRAKE APPLICATION FORCE MEASUREMENT OF A DISC BRAKE AND A CORRESPONDING DISC BRAKE

CROSS REFERENCE TO RELATED APPLICATIONS

This application is a continuation of PCT International Application No. PCT/EP2013/001085, filed Apr. 12, 2013, which claims priority under 35 U.S.C. §119 from German Patent Application No. 10 2012 007 471.9, filed Apr. 13, 2012, the entire disclosures of which are herein expressly incorporated by reference.

BACKGROUND AND SUMMARY OF THE INVENTION

The invention relates to a measuring arrangement for brake application force measurement of a disc brake. It also relates to a corresponding disc brake.

Disc brakes can have different measuring arrangements for detecting a brake application force, wherein for this purpose, for example, pressure sensors are used in a hydraulic brake. However, a disc brake on a vehicle is subjected to relatively extreme operating conditions which can influence in different ways a measurement variable which correlates with the brake application force of the disc brake.

A measuring arrangement for brake application force measurement of a disc brake is described, for example, in DE 10 2009 041 951. In the disc brake in said document, the brake application force sensor is arranged in its observation direction in an extension of the displacement travel of the measurement object or the target object section thereof. Although this measuring arrangement has proven effective in practice, malfunctions can occur if contamination or other particles, which no longer permit contactless measurement, accumulate between the brake application force sensor and the measurement object or the target object section thereof. In such cases, the contamination or the other particles bring about a risk of contact between the brake application force sensor and the measurement object or the target object section thereof which are displaced with respect to one another. In the case of further displacement, a faulty signal is then output via the evaluation unit. The same fault occurs if the brake application force sensor and the measurement object or the target object section thereof are in direct contact with one another. This can be caused by incorrect adjustment of the measuring arrangement during its installation, with the result that the measuring arrangement cannot detect the entire possible displacement travel of the caliper head and caliper back of the brake caliper.

The object of the present invention is therefore to make available an improved measuring arrangement. A further object is to provide an improved corresponding disc brake.

This and other objects are achieved by a measuring arrangement, and a corresponding disc brake, having: a) two components of the disc brake which can be moved, in particular displaced, relative to one another along a travel path when the brake application force is applied, b) at least one brake application force sensor having a housing; c) a measurement object which is one of the two components or can be connected permanently to one of the two components and has at least one element or at least one target object with at least one such element for contactless interaction with the brake application force sensor; and d) an evaluation unit, wherein e) the brake application force sensor is designed to detect displacement of the measurement object along the travel path with the evaluation unit for converting the detected displacement into a measurement variable as a measure of the brake application force, f) the brake application force sensor and the measurement object can be attached to the respective component of the two components in such a way that they can be removed again, and g) the brake application force sensor is arranged outside the travel path of the measurement object and with its observation direction at a right angle to the travel path.

An advantageous feature of the invention is that the brake application force sensor and the measurement object can be attached to the respective component of the two components in such a way that they can be removed again. This results in simple mounting and a short replacement time during maintenance and servicing, wherein at the same time the accuracy of the determined measurement variable is retained. The field of application is enlarged and comprises disc brakes of any design, even those with self-energization.

Accordingly, a measuring arrangement for brake application force measurement of a disc brake preferably has the following: two components of the disc brake which can be moved, in particular displaced, relative to one another along a travel when the brake application force is applied, at least one brake application force sensor having a housing; a measurement object, which is one of the two components or can be connected permanently to one of the two components, and has at least one element or at least one target object with at least one such element for contactless interaction with the brake application force sensor; and an evaluation unit, wherein the brake application force sensor is designed to detect displacement along the travel with the evaluation unit for converting the detected displacement into a measurement variable as a measure of the brake application force, and wherein the brake application force sensor and the measurement object can be attached to the respective component of the two components in such a way that they can be removed again. In this context the brake application force sensor is arranged outside the travel of the measurement object and with its observation direction or its longitudinal axis at a right angle to the travel.

As a result, the situation is advantageously avoided in which the measurement object is displaced with its front onto the brake application force sensor and, under certain circumstances, even makes contact with it at the front, which would result in falsification of measured values. According to the invention, the measurement object is instead displaced in front of the brake application force sensor without the risk of a collision.

In one advantageous embodiment of the measuring arrangement, the element is made of metal and the brake application force sensor is embodied as an eddy current sensor. The brake application force sensor is preferably a Hall sensor or is embodied as an inductively operating sensor. In this way, contactless measurement of the displacement travel is made possible in a way which has little susceptibility to faults. The brake application force sensor particularly preferably has a plurality of, preferably three, coils, wherein difference signals of a second and third coil are used to correct interference signals. In this way, a correction of a signal of a first coil can be carried out, for example in order to obtain an output signal of the brake application force sensor which is linear as a function of the travel.

In one advantageous refinement of the measuring arrangement, the element is constructed with a contour, as a result of which the brake application force sensor picks up a signal which changes with the displacement travel. In this way, the signal can also be influenced as a function of the travel, for example in order to linearize said signal or to obtain other advantageous curve profiles between the travel and the output signal.

In a further refinement of the measuring arrangement, other measuring principles than the previously mentioned principle of an eddy current sensor can be used in the brake application force sensor.

The brake application force sensor and the measurement object can be attached to the respective component of the two components in a centered and/or positively locking fashion and in such a way that they can be removed again. As a result, the mounting time is shortened, wherein orientation times are reduced to a minimum. The brake application force sensor can advantageously be attached to the caliper head and the measurement object can be attached to the second component in a centered and/or positively locking fashion and in such a way that they can be removed again.

The brake application force sensor can be permanently connected to the caliper head and is arranged at a distance from the element of the measurement object with the observation direction at a right angle to the displacement direction of the measurement object in such a way that the free end of the measurement object is moved past the brake application force sensor at a constant distance during its brake application force-induced displacement.

A pickup device with at least one coil and an amplifier device can be arranged in the housing of the brake application force sensor. This arrangement is advantageous since in this way the detected measurement variable signal can be amplified in the shortest way without interference influences by electromagnetic fields from the outside. In order to increase the immunity to interference additionally with respect to moisture and dust, the housing can be hermetically sealed. In one embodiment, the housing is manufactured, for example, from a plastic such as, for example, glass-fiber-reinforced polyamide.

The brake application force sensor is oriented with the coil of the pickup device in a pickup longitudinal axis at a right angle to the element of the measurement object. This can be embodied, for example, easily by means of a centering device which forms positive engagement by means of surfaces, edges, centering pins, centering bolts or the like.

The brake application force sensor has a measuring range which is larger than the maximum relative displacement of the two components with respect to one another, brought about by the brake application force, by amounts equal to the installation tolerances and thermally induced changes in length. As a result, influencing as a result of interference variables such as changes in length and installation tolerances are largely reduced.

An end face of the brake application force sensor can be arranged at a distance from the element of the measurement object, between 0 mm and 10 mm, preferably between 0.5 mm and 6.5 mm. Eddy current sensors are available which also supply a high-accuracy signal at a very short distance.

In order to adapt to the surroundings, the brake application force sensor can be designed to output a sensor signal which can be calibrated to the material of the measurement object, of the target object, the material of the surroundings of the measurement object and/or of the target object and/or the geometry of the measurement object and/or of the target object. In this context, surface coatings of the end face of the brake application force sensor and of the element of the measurement object can also be taken into account. The material of the housing of the brake application force sensor can also be included in the calibration. For this purpose, the evaluation unit has, for example, a memory in which corresponding values are stored in table form, calibration being made possible in a simple way on the basis of said values. This memory can also contain values which can be used to output a temperature-compensated sensor signal and/or for a zero point adjustment of a sensor signal which is to be output.

The zero point corresponds here to the state of the unactivated brake which serves as a reference for any braking operation. This zero point can be displaced by a small amount during operation (as a result of vibrations, temperature expansion, etc.) and to a relatively large extent during maintenance and servicing (for example, change of brake pads). The absolute value of the zero point is not significant owing to linearization of the sensor signal. The brake application force sensor can therefore also be designed to output a linearized sensor signal by virtue of the fact that the associated values are stored in the evaluation unit. The linearization of the sensor signal can be embodied with respect to a change in position of the measurement object, target object and/or the brake application force.

In one embodiment, the pickup device, the amplifier device and the evaluation unit can be arranged in the housing, which results in a compact design.

In an alternative embodiment, the pickup device can be arranged in the housing. In this way, it is then possible for only the coil to be then present in the housing, which as a result becomes considerably smaller. In this context, further switching units of the pickup device, the amplifier device and the evaluation unit can be arranged separately therefrom. This can be integrated, for example, in a wear sensor unit of the brake or in a control unit. This can make simplified routing of the cable possible, with combination of cables, which reduces installation expenditure.

In another alternative, the pickup device and the amplifier device can be arranged in the housing, wherein the evaluation unit can be arranged in a wear sensor unit of the disc brake. In this context, the software of the evaluation unit can be a component of the software of the wear sensor unit, which also entails savings in terms of space and components.

In this way, the brake application force sensor can be provided with at least one permanently connectable connecting line and/or output line, and/or at least one connecting line and/or output line which can be connected via plug-type connector devices. The resulting combination of cables with the wear sensor unit or other units of the brake can be led onwards as a common cable to an EBS control unit.

A cable combination of the sensor cable and of a wear sensor cable is also possible, and this in turn reduces installation expenditure and installation space. The sensor cable can, of course, also be connected directly to a brake control unit.

The housing can easily be attached to one of the components and/or to a base plate of the disc brake in a simple manner by use of at least one attachment element directly and/or via at least one clip. For the purpose of rapid mounting and dismounting, the housing can also be screwed.

The measurement object can be embodied as a brake pad holding bracket which can be permanently connected to the one of the two components of the disc brake, in particular to the caliper back and which has the at least one end face or the at least one target object with at least one end face. The target object can be connectable directly to the brake pad holding bracket, directly or via a holding element. In this way, the target object, which is metallic or has a metallic element, can be screwed on, riveted on, welded on or joined on in some other way. It can be embodied in one piece with the pad holding bracket. Of course, the pad holding bracket can have more than one metallic element or more than one target object. As a result of the fact that the measuring arrangement is partially arranged on the pad holding bracket, or the pad holding bracket is part of the measuring arrangement, simple replacement possibilities during maintenance and servicing of the brake are obtained. Retrofitting of a brake around the measuring arrangement is also simplified.

In order to increase the measuring accuracy, the pad holding bracket can be attachable with a centering device to the one component. Nevertheless, the pad holding bracket can be replaced and removed with simple measures. Such securing will occur at least in the measuring direction of the sensor. The measuring direction is here the direction in which the pickup longitudinal axis of the sensor extends, with the result that displacement of the measurement object transversely with respect to its pickup longitudinal axis is detected by the sensor.

In order to bring about positive guidance, i.e. without a transverse offset, sagging etc., the pad holding bracket can be guided in a displaceable fashion with a guide device on the other component, in particular on the caliper head for the positive guidance in the direction of the travel. The pad holding bracket is therefore not rigidly attached to the other component, in particular to the caliper head of the disc brake, and is at least freely movable in the measuring direction of the sensor, with the result that the target object is moved past during the brake application force build up during the build up of brake application force by the coil of the sensor. This embodiment can be constructed in such a way that the pad holding bracket is restricted in its freedom of movement or in its degrees of freedom with respect to the brake disc in the radial direction and/or in the circumferential direction by, for example, correspondingly shaped surfaces on the brake caliper and/or base plate of the disc brake. The attachment of the pad holding bracket on the caliper back can therefore prevent pivoting movements of the target object on said caliper back transversely with respect to the pickup longitudinal axis of the coil of the sensor. As a result, the freedom of movement of the target object can be restricted with respect to the brake disc, in the radial direction and/or in the circumferential direction.

The attachment of the pad holding bracket on the caliper back can be, for example, a bolt connection, a screw connection, a combination thereof or with additional positive engagement.

For the sake of simplified calibration, the pad holding bracket and the target object can be manufactured from one material which has fixed properties for the calibration.

So that the measurement remains precise in the event of possible pivoting movements of the target object or of the pad holding bracket, the element can be embodied in a planar fashion, in particular with a planar face positioned perpendicularly with respect to the pickup longitudinal axis. As a result, this ensures that the distance between the brake application force sensor and the element of the target object or the target object itself does not change in the event of pivoting movements of the target object or of the pad holding bracket.

A brake application force sensor for a measuring arrangement as described above is embodied as described above.

A brake pad holding bracket can be used as described for a measuring arrangement above.

A disc brake according to the invention having a brake caliper which engages over a brake disc and has a caliper head and caliper back connected thereto, wherein brake pads which can be pressed onto the brake disc on both sides and are secured radially by way of a pad holding bracket are mounted in the brake caliper, characterized in that said disc brake has the measuring arrangement specified above. The measuring arrangement measures the change in the span length of the brake caliper which occurs when a clamping force acts, as a relative displacement of the free end of the second component, serving as a measurement object, relative to the caliper head. In this context, the brake application force sensor is arranged with its observation direction at a right angle to the longitudinal axis of the brake disc and therefore to the displacement direction of the free end of the second component.

In one embodiment, the disc brake has a brake caliper which connects, in the manner of a frame, a caliper head which is arranged on the activation side parallel to the disc brake to a caliper back, located on the opposite side of the brake disc, via tie rods which are arranged spaced apart in parallel and longitudinally with respect to the brake disc rotational axis. In this context, the mounting opening which is formed by the spacing apart of the tie rods is dimensioned to be so large that the brake pads are freely accessible and removable for the purpose of replacing them owing to wear, and when a clamping force is applied the distance between the caliper head and the caliper back is changed virtually in proportion to this clamping force.

In a further refinement, the disc brake has a component which bridges the mounting opening in the axial direction and parallel to the tie rods approximately centrally and is secured to the caliper back by means of an attachment element, and is supported on the caliper back against radial and, under certain circumstances, also tangential displacement in such a way that axial displacement of the free end of this second component is possible.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components or functional units with the same function are characterized by the same reference symbols in the figures.

Figure 1:
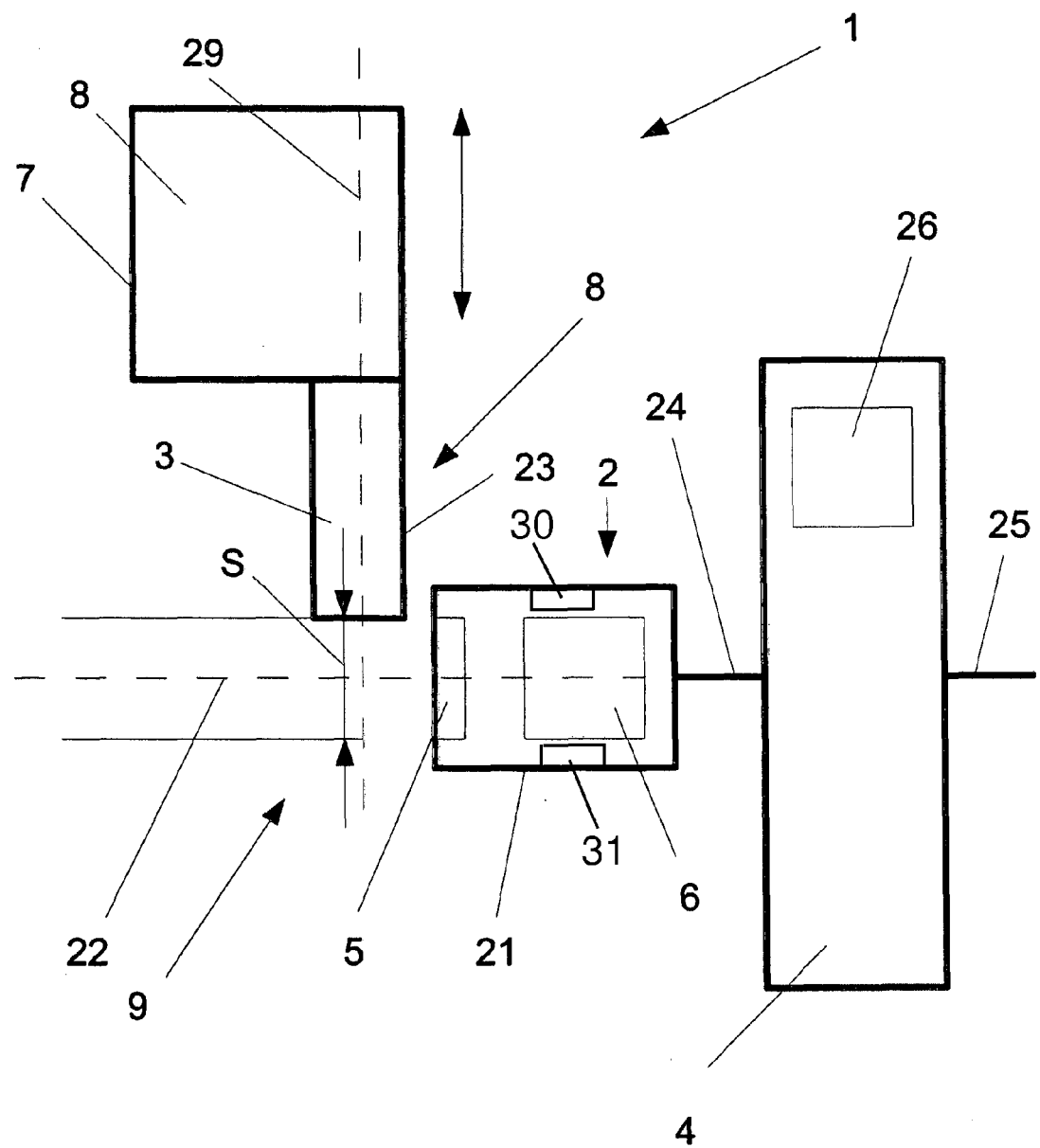
FIG. 1 is a schematic block illustration of a first exemplary embodiment of a measuring arrangement according to the invention.

FIG. 1 shows a schematic block illustration of a first exemplary embodiment of a measuring arrangement 1 according to the invention.

The measuring arrangement 1 includes a brake application force sensor 2, an evaluation unit 4 and a measurement object 7 with a target object 3. The measurement variable which is to be detected is a travel S which is carried out by the measurement object 7, here between the target object 3 or an element 23 which is assigned to the target object 3, as result of a displacement (double arrow) of the measurement object 7 relative to the parallel to a pickup device of the brake application force sensor 7 or at a right angle to a pickup longitudinal axis 22. The measurement object 7 is a component or a section of such a component which can move in the direction of the double arrow as a result of an application of force. In this context, in this example the measurement object 7 is a section of a brake caliper 10 (see FIG. 2) or a component (for example a brake pad holding bracket 7') which is permanently connected to one side of the brake caliper 10 of a brake, wherein the brake application force sensor 2 is connected to a side of the brake caliper 10 lying opposite this side. In the event of a braking process, the brake caliper widens owing to an applied brake application force, wherein this widening is detected as a measurement variable travel S. The measurement variable travel path S is here a measure of the brake application force. The measurement is preferably carried out in a contactless fashion.

The target object 3 is arranged in a target object section 8 of the measurement object 7. In this example, the object is a metal plate with specific known properties such as, for example, thermal expansion. The movement of the measurement object 7 is transmitted to the target object 3, with the result that the latter moves transversely with respect to the pickup longitudinal axis 22 to the same extent as the measurement object 7. The target object 3 comprises the element 23 which is arranged parallel to the pickup longitudinal axis 22.

The pickup longitudinal axis 22 is at the same time the longitudinal axis of the brake application force sensor 2. The brake application force sensor 2 includes in this example a housing 21, a pickup device 5 and an amplifier 6. The pickup device 5 and the amplifier 6 are located in the housing 21. The pickup device 5 has a longitudinal axis which is at the same time the pickup longitudinal axis 22. The housing 21 is hermetically sealed in this embodiment. The brake application force sensor 2 is shown in this embodiment with second and third coils 30, 31, in addition to the pickup device 5, which may generate difference signals usable to correct the signals from pickup device 5.

The brake application force sensor 2 is embodied in this example as an eddy current sensor. In this context, the pickup device 5 has a coil which generates an electromagnetic alternating field which penetrates the target object and brings about eddy currents in the material of the metallic target object. The intensity of the eddy currents is dependent on the travel S in such a way that in the case of relatively short travel values S the intensity is greater than in the case of relatively long travel values. The electromagnetic alternating field which is generated in the coil is generated by applying electrical energy at a specific level with a specific frequency of the pick-up device 5 to the coil. As a function of the intensity of the eddy currents generated in the target object 3 and the energy consumed in the process, the pickup device 5 determines an electrical variable as a sensor signal, which variable is proportional to the travel S. This electrical variable, for example current or voltage, is then amplified by the amplifier 6 and conducted on to the evaluation unit 4 via a connecting line 24. The evaluation unit 4 has here a memory 26 in which, for example, table values are stored with which the evaluation unit 4 can process the electrical variable supplied by the brake application force sensor 2. This can be, for example, a linearization, calibration, temperature compensation, zero point adjustment, etc. For this purpose, the evaluation unit 4 can have at least one temperature sensor and/or a temperature signal which is used, for example, by the force application sensor 2 or some other source (for example brake control unit, brake pad wear sensor) for evaluation.

The brake application force sensor 2 can be connected either permanently or in a pluggable fashion to its connecting line 24 on the evaluation unit 4. It is also possible for the evaluation unit 4 to be arranged completely in the brake application force sensor 2. The evaluation unit 4 can, however, also be accommodated in wear sensor electronics (not shown) of the brake or be integrated fully therein, for example as a component of software. Another arrangement can comprise the fact that the brake application force sensor 2 can consist only of the housing 21 and the coil of the pickup device 5, wherein all the other circuits and switching units are arranged in the evaluation unit 4 (separately or integrated in some other way as described above). The sensor signal which is made available and processed by the evaluation unit 4 is output as a measured value of the brake application force via an output line 25 and passed on to a further processing units, for example an EBS system.

The connecting line 24 or the output line 25 can, according to the arrangement described above:

(a) be connected directly to a brake system, (b) be connected to a wear sensor system (permanently or via plug-type connections) and can be extended onward from there in a common cable, for example to an EBS, and/or (c) be combined with a cable of a wear sensor.

The element 23 of the target object 3 and the assigned end face of the pickup device 5 of the brake application force sensor 2 are, for example, arranged at a distance between 0 and 10 mm, preferably 0.5 and 6.5 mm.

The measuring range of the brake application force sensor 2 is embodied so as to be larger than a maximum displacement which is brought about by the brake application force of the brake, by an amount equal to the installation tolerances and thermally induced changes in length which occur.

The calibration properties of the evaluation unit 4 are configured in such a way that the brake application force sensor 2 or its generated sensor signal is calibrated to the material of the target object 3. Calibration of the target object 3 during the coating thereof, for example with paint or other layers, is also possible, as is calibration to the surroundings thereof, for example the geometry of the measurement object 7 or the target object section 8.

In the case of zero point adjustment, the zero point corresponds here to the state of the unactivated brake, which serves as a reference for any braking operation. This zero point can be displaced to a relatively small degree during operation (by shocks, temperature expansion etc.) and to a relatively large extent during servicing of the brakes (for example change of brake pad). The absolute value of the zero point is not significant owing to the linearization of the sensor signal by the evaluation unit 4.

Linearization of the sensor signal with respect to the change in position of the target object 3 or to the brake application force of the brake is possible by the evaluation unit 4.

The housing 21 of the brake application force sensor 2 is manufactured from a resistant material, for example plastic in a glass-fiber-reinforced polyamide embodiment. An example of attachment to a brake is shown in FIG. 2.

Figure 2:
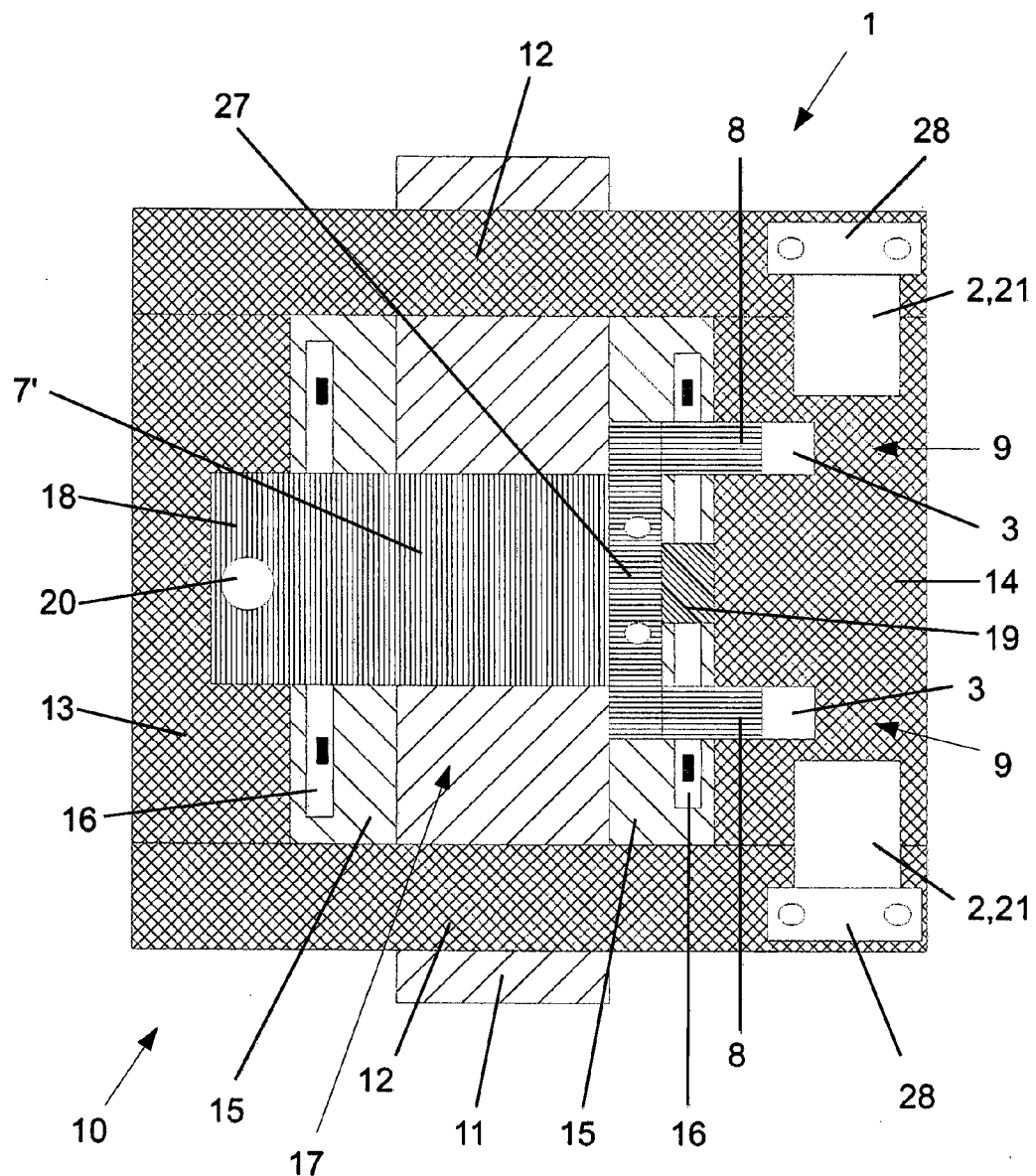
FIG. 2 is a schematic view of a variation of the measuring arrangement according to the invention with a disc brake.

FIG. 2 illustrates a schematic view of a variation of the measuring arrangement 1 according to the invention with a disc brake.

The disc brake can be operated pneumatically, hydraulically or electrically. It has a brake caliper 10 which engages over a brake disc 11. Brake pads 15, which can be pressed against the brake disc 11 by means of a brake application device for the purpose of braking, are arranged on both sides of the brake disc 11.

The brake caliper 10 is composed of a caliper back 13 and a caliper head 14 which are connected to one another by two tie rods 12. The tie rods 12 extend in the axial direction of the brake disc 11 and bound a mounting opening 17 of the brake caliper 10 in the circumferential direction of the brake disc 11.

The brake pads 15 are held under prestress in the brake caliper 10, for which purpose each brake pad 15 has a pad holding spring 16 on which a pad holding bracket 7' is supported. The pad holding bracket 7' is permanently connected to the caliper back 13 at one end with an attachment section 18 by way of an attachment element 20, for example a screw, whereas its other end is mounted in an axially displaceable fashion in a pickup pocket 19 of the caliper head 14. In this context, the pad holding bracket 7' spans the mounting opening 17 and extends in its length in the axial direction of the brake disc 5.

In its end region facing the pickup pocket 19, the pad holding bracket 7' has a U-shaped measurement bracket 27 with two ends which extend in the axial direction of the brake disc 11. In this second exemplary embodiment, the measuring arrangement 1 includes two measuring points 9 which are arranged parallel to one another and each have a brake application force sensor 2 and a target object 3. The target objects 3 are located here at the ends of the measurement bracket 27 which form target object sections 8. The measurement object 7, here in the embodiment of the pad holding bracket 7', is permanently connected to the caliper back 13.

The brake application force sensors 2 are permanently connected here to the caliper head 14 and are oriented with their pickup longitudinal axes 22 (FIG. 1) transversely with respect to the axis of the brake disc 11. The widening of the brake caliper 10 when a brake application force is applied brings about spreading of the caliper back 13 and caliper head 14, i.e. the width of the mounting opening 17 becomes larger. This spreading or widening of the brake caliper 10 is detected by the brake application force sensors 2 in that they measure the widening as travel S (see FIG. 1) between the end face of the brake application force sensors 2 and the target objects 3 or the metallic elements 23 thereof in the manner described above. Since two brake application force sensors 2 are present here in this measuring arrangement of FIG. 2, the signals thereof can also be averaged in the evaluation unit 4, which permits greater accuracy to be achieved in the measurement of the brake application force.

The brake application force sensors 2 are attached here by their housings 21 to the caliper head 14 by means of a clip 28 and two screws. Such a clip 28 is attached to the housing 21 in the longitudinal direction and extends parallel to the axis of the brake disc 11. In another embodiment, the clip 28 can also comprise the housing 21 in the manner of a sleeve. The housings 21 have, for the purpose of centering and orientation with the target objects 3, faces which interact with faces of the caliper head 14. Other attachment and centering possibilities are, of course, possible. This results in simple replacement possibilities during maintenance and servicing of the brake.

In this embodiment, the target objects 3 are embodied in one piece with the measurement bracket 27, and the measurement bracket 27 is permanently connected to the pad holding bracket 7' by a screwed connection.

In a multi-part embodiment of the lining holding bracket 7' and target object 3, an advantage is that the material of the target object 3 can be matched better to sensor parameters since the pad holding bracket 7' does not have to have all the functional properties of the target object 3.

The pad holding bracket 7' can also be attached in a positively locking fashion to the brake caliper 10 via a centering device, for example faces and/or pins/bolts, provided in addition to the attachment.

The receptacle pocket 19 can be embodied in such a way that it permits such guidance of the pad holding bracket 7' that the latter cannot carry out any movements transversely with respect to the target object longitudinal axis 29 (FIG. 1) during braking operations.

In FIG. 2, the housing 21 of the brake application force sensor 2 is provided with an end-side clip. It can be fitted here, for example, into a receptacle provided on the caliper head 14 and then secured to the caliper head 14 by the clip. Centering is provided here by the positive engagement between the receptacle and the housing 21. Of course, faces which prevent the housing 21 from rotating in the receptacle are also possible here.

A distance between the element 23 of the target object 3 and the end face of the brake application force sensor 2 is in FIG. 2, as described above under FIG. 1, between 0 and 10 mm, preferably between 0.5 and 6.5 mm. Of course, other distance dimensions are also possible, and they can be dependent upon, for example, the type and sensitivity of the brake application force sensor 2.

The invention is not restricted to the exemplary embodiments described above but rather can be modified within the scope of the appended claims.

The pad holding bracket 7' can be embodied, for example, as a punched/bent part.

LIST OF REFERENCE SYMBOLS

1 Measuring arrangement
2 Brake application force sensor
3 Target object
4 Evaluation unit
5 Pickup device
6 Amplifier
7 Measurement object
7' Brake pad holding bracket
8 Target object section
9 Measurement point
10 Brake caliper
11 Brake disc
12 Tie rod
13 Caliper back
14 Caliper head
15 Brake pad
16 Pad holding spring
17 Mounting opening
18 Attachment section
19 Receptacle pocket
20 Attachment element
21 Housing
22 Pickup longitudinal axis
23 Element
24 Connecting line
25 Output line
26 Memory device
27 Measurement bracket
28 Clip
29 Target object longitudinal axis
S Travel path The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A measuring arrangement for measuring brake application force in a disc brake, comprising:
    first and second components of a caliper of the disc brake, the first and second components being at least one of formed by and affixed to the caliper and displaceable relative to one another along a travel path when brake application force is applied;
    a brake application force sensor, the brake application force sensor being affixed to a first one of the first and second components of the caliper and including a housing;
    a measurement object at least one of formed by and affixed to a second one of the first and second components, the measurement object comprising an element configured for contactless interaction with the brake application force sensor;
    an evaluation unit coupled to the brake application force sensor, wherein:
    the brake application force sensor is configured to detect the displacement of the measurement object along the travel path due to elastic deformation of the caliper,
    the evaluation unit is configured to convert the detected displacement into a measurement variable that is a function of the brake application force,
    the brake application force sensor and the measurement object is attachable to the respective one of the first and second components so as to be removable, and
    the brake application force sensor is arranged outside the travel path of the measurement object, wherein an observation direction of the brake application force sensor is at a right angle to the travel path of the measurement object.

2. The measuring arrangement according to claim 1, wherein the element for contactless interaction with the brake application force sensor is made of metal, and the brake application force sensor is an eddy current sensor.

3. The measuring arrangement according to claim 2, wherein the eddy current sensor is a Hall sensor.

4. The measuring arrangement according to claim 2, wherein the eddy current sensor is an inductively operating sensor.

5. The measuring arrangement according to claim 4, wherein the inductively operating sensor comprises at least three coils, wherein difference signals of a second and a third one of the three coils are used to correct interference signals.

6. The measuring arrangement according to claim 1, wherein the element is constructed with a defined contour such that the brake application force sensor picks-up a signal which changes with the displacement travel of the element.

7. The measuring arrangement according to claim 1, wherein the brake application force sensor and the measurement object are attachable to respective ones of the first and second components in a centered and/or positive locking manner so as to be removable.

8. The measuring arrangement according to claim 1, wherein:
    the brake application force sensor is permanently connected to a respective one of the first and second components and arranged at a distance from the element of the measurement object of the other of the first and second components, and
    the one component of the first and second components being a caliper back of a caliper of the disc brake, and the other of the first and second components being a caliper head of the caliper of the disc brake.

9. The measuring arrangement according to claim 1, wherein the brake application force sensor comprises a pick-up device having at least one coil and an amplifier arranged in the housing.

10. The measuring arrangement according to claim 9, where the housing is hermetically sealed.

11. The measuring arrangement according to claim 9, wherein the brake application force sensor is oriented with the coil of the pick-up device being in a pick-up longitudinal axis that is at a right angle to a target object longitudinal axis.

12. The measuring arrangement according to claim 1, wherein an end face of the application force sensor is arranged at a distance from the element of the measurement object.

13. The measuring arrangement according to claim 12, wherein the distance has a value between 0 millimeters and 10 millimeters.

14. The measuring arrangement according to claim 12, wherein the distance has a value between 0.5 millimeters and 6.5 millimeters.

15. The measuring arrangement according to claim 1, wherein the brake application force sensor has a permanently connectable connecting line, said connecting line being couplable to a wear sensor unit.

16. The measuring arrangement according to claim 1, wherein the measurement object is a brake pad holding bracket permanently connectable to one of the first and second components of the disc brake.

17. The measuring arrangement according claim 16, wherein at least one target object is attached to the element of the brake pad holding bracket.

18. The measuring arrangement according to claim 16, wherein at least one target object is formed in one piece with the element of the brake pad holding bracket forming the measurement object.

19. The measuring arrangement according to claim 1, wherein the element has a planar form with a planar face positioned perpendicularly with respect to a pick-up longitudinal axis of the brake application force sensor.

20. A disc brake, comprising:
    a brake caliper which, in use, engages over a brake disc and comprises a caliper head and a caliper back;
    brake pads arranged in the disc brake, the brake pads being pressable onto the brake disc;
    a brake pad holding bracket by which the brake pads are secured radially in the disc brake, the brake pad holding bracket being mounted in the brake caliper;
    a measuring arrangement for measuring brake application force in the disc brake, the measuring arrangement comprising:
        (a) first and second components of a caliper of the disc brake, the first and second components being at least one of formed by and affixed to the caliper and displaceable relative to one another along a travel path when brake application force is applied;
        (b) a brake application force sensor, the brake application force sensor being affixed to a first one of the first and second components of the caliper and including a housing;

(c) a measurement object at least one of formed by and affixed to a second one of the first and second components, the measurement object comprising an element configured for contactless interaction with the brake application force sensor;

(d) an evaluation unit coupled to the brake application force sensor, wherein:

the brake application force sensor is configured to detect the displacement of the measurement object along the travel path due to elastic deformation of the caliper, the evaluation unit is configured to convert the detected displacement into a measurement variable that is a function of the brake application force, the brake application force sensor and the measurement object is attachable to the respective one of the first and second components so as to be removable, and the brake application force sensor is arranged outside the travel path of the measurement object, wherein an observation direction of the brake application force sensor is at a right angle to the travel path of the measurement object.

* * * * *